United States Patent [19]

Vance

[11] Patent Number: 4,464,525

[45] Date of Patent: Aug. 7, 1984

[54] NEAR INFRARED ABSORBING POLYMERIZATE, FROM DICARBOXYLIC COMPOUND, DIOL BIS(ALLYL CARBONATE) AND METAL HEXACARBONYL

[75] Inventor: Jeffrey D. Vance, Barberton, Ohio

[73] Assignee: PPG Industries, Inc., Pittsburgh, Pa.

[21] Appl. No.: 483,966

[22] Filed: Apr. 11, 1983

[51] Int. Cl.$^3$ ............................................. C08G 83/00
[52] U.S. Cl. .................... 528/9; 528/271; 528/370; 528/392; 252/587
[58] Field of Search ................... 528/9, 271, 370, 392; 252/587

[56] References Cited

U.S. PATENT DOCUMENTS

| | | | |
|---|---|---|---|
| 3,355,294 | 11/1967 | Giddings | 96/98 |
| 3,576,755 | 4/1971 | Patella et al. | 252/300 |
| 3,692,688 | 9/1972 | Castellion et al. | 252/300 |
| 4,069,168 | 1/1978 | Leatherman et al. | 252/300 |
| 4,181,626 | 1/1980 | Leatherman | 252/300 |

OTHER PUBLICATIONS

M. A. El-Sayed, "A New Class of Photochromic Substances:Metal Carbonyls," *J. Phys. Chem.*, 68(2), pp. 433–434, Feb. 1964.

A. G. Massey, "A Reversible Photochromic Polymer," *Nature*, 4796, p. 1387, (Sep. 30, 1961).

*Primary Examiner*—Harold D. Anderson
*Attorney, Agent, or Firm*—Irwin M. Stein; Richard M. Goldman

[57] ABSTRACT

Disclosed is an optically clear casting prepared by polymerizing a composition comprising (1) a diol bis(allyl carbonate) monomer, e.g., diethylene glycol bis(allyl carbonate), (2) from about 1 to about 10 weight percent of a saturated aliphatic or aromatic dicarboxylic acid containing from 3 to 10 carbon atoms, e.g., succinic acid and phthalic acid or the anhydrides of succinic acid and phthalic acid, and (3) an infrared absorbing amount, e.g., 1.5 to 4.0 weight percent, of a metal hexacarbonyl, e.g., tungsten, molybdenum or vanadium hexacarbonyl. The castings are capable of absorbing near infrared radiation and are useful as optical, e.g., ophthalmic, lenses.

8 Claims, No Drawings

NEAR INFRARED ABSORBING POLYMERIZATE, FROM DICARBOXYLIC COMPOUND, DIOL BIS(ALLYL CARBONATE) AND METAL HEXACARBONYL

DESCRIPTION OF THE INVENTION

Near infrared absorbing optical castings are desired in order to block the passage of infrared radiation from an incident source to the eye. By "near infrared" is meant that portion of the electromagnetic spectrum having a wave length of from about 700 to about 2000 nanometers.

U.S. Pat. No. 4,181,626 to Leatherman for *Method of Preparing Tungsten Hexacarbonyl Containing Polymers and Polymers Prepared Thereby*, describes a near infrared absorbing diol bis(allyl carbonate) polymerizate containing a near infrared absorbing amount of tungsten hexacarbonyl and a solubility enhancing amount of an olefinically unsaturated carboxylic acid, exemplified by maleic acid anhydride.

However, maleic acid anhydride is characterized by dermal toxicity. Moreover, maleic acid anhydride has a low boiling point, i.e., a high vapor pressure at the temperatures necessary to form the solution of diol bis(allyl carbonate), unsaturated carboxylic acid, and metal hexacarbonyl. This causes the evaporation or stripping of maleic acid anhydride from the solution, and results in polymerization and color control problems as well as an undesirable gaseous emission.

Additionally, the reaction of maleic acid anhydride with infrared absorbing metal hexacarbonyls requires long heating times at high temperatures prior to polymerization. For these reasons the use of maleic acid anhydride is industrially unacceptable.

It has now been found that these disadvantages can be substantially eliminated by utilizing a near infrared absorbing polymerizate of bis(allyl carbonate) containing a near infrared absorbing amount of a near infrared absorbing metal carbonyl and a saturated dicarboxylic acid, i.e. an aliphatic or aromatic dicarboxylic acid.

Especially preferred are saturated dicarboxylic acid anhydrides. Saturated dicarboxylic acid anhydrides, e.g., succinic acid anhydride and phthalic acid anhydride, have lower vapor pressures and lower dermal toxicity than maleic anhydride.

DETAILED DESCRIPTION OF THE INVENTION

It has now been found that near infrared absorbing metal hexacarbonyls, e.g., tungsten hexacarbonyl, molybdenum hexacarbonyl or vanadium hexacarbonyl, may be incorporated in diol bis(allyl carbonate) polymers in high concentrations, i.e., concentrations high enough to produce optically clear castings that are permanently light absorbing and have substantial near infrared absorbance. By "permanently light absorbing" is meant the substantial absence of a return to a water-white condition when shielded from ultraviolet radiation. By "substantial near infrared absorbance" is meant absorbance in the near infrared region at least as great as the average absorbance in the visible region.

In accordance with the practice of one exemplification of the invention, an infrared absorbing metal hexacarbonyl is dissolved or dispersed in a saturated dicarboxylic acid, e.g., succinic acid, succinic acid anhydride, phthalic acid, phthalic acid anhydride, or the like. Thereafter, the composition of metal hexacarbonyl in the saturated dicarboxylic acid is added to the diol bis(allyl carbonate) monomer, and the resulting monomeric solution polymerized to yield a permanently near infrared absorbing polymer.

In accordance with the practice of an alternative exemplification of this invention, the saturated dicarboxylic acid, e.g., succinic acid, succinic acid anhydride, phthalic acid, or phthalic acid anhydride, is dissolved in the diol bis(allyl carbonate). Thereafter, the metal hexacarbonyl may be added to the solution or liquid composition of saturated dicarboxylic acid in diol bis(allyl carbonate). The resulting monomeric solution may then be polymerized to yield a permanently near infrared absorbing polymer.

Alternatively, the solution of infrared absorbing metal hexacarbonyl and saturated dicarboxylic acid in diol bis(allyl carbonate) prepared as described hereinabove may be a concentrated solution, which may be added to diol bis(allyl carbonate) and thereafter polymerized. Solutions of tungsten, molybdenum or vanadium hexacarbonyl in saturated dicarboxylic acid are colorless to blue or blue green in color and, when protected from prolonged exposure to high temperatures, are sufficiently stable to be shipped and stored. Such compositions may be made up and shipped to a lens maker who may add them to bis(allyl carbonate) monomer in a lens fabricating process. According to an alternative exemplification, a solution of tungsten, molybdenum, or vanadium hexacarbonyl in saturated dicarboxylic acid may be made up as described hereinabove and added to bis(allyl carbonate) and these compositions shipped to a lens maker for use in a lens making process. According to a still further exemplification of the method of this invention, a solution of tungsten, molybdenum, or vanadium hexacarbonyl in saturated dicarboxylic acid may be made up and added to bis(allyl carbonate) monomer. A suitable dye, for example, CIBA-Geigy ORASOL® yellow-ZGLN, may be added to the liquid composition in order to obtain a green polymerizate. Thereafter, the resulting liquid composition of the metal hexacarbonyl, saturated dicarboxylic acid, bis(allyl carbonate) monomer, and dye, may be shipped to a lens maker for use in a lens making process.

The infrared absorbing metal hexacarbonyls include tungsten hexacarbonyl, $W(CO)_6$, molybdenum hexacarbonyl, $Mo(CO)_6$, and vanadium hexacarbonyl, $V(CO)_6$. Preferred are tungsten hexacarbonyl and molybdenum hexacarbonyl, especially tungsten hexacarbonyl.

The saturated dicarboxylic acids herein contemplated include aliphatic dicarboxylic acids, i.e., acids having the formula $HOOC-(CH_2)_nCOOH$, where n is an integer from 1 to 8, as exemplified by maleic acid, succinic acid, glutaric acid, adipic acid, pimelic acid, suberic acid, azelaic acid, and sebacic acid, and aromatic dicarboxylic acids, i.e., phthalic acid, isophthalic acid, and terephthalic acid, as well as aliphatic dicarboxylic acid anhydrides having the formula

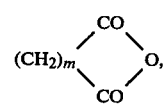

where m is 2 or 3, e.g., succinic anhydride, and aromatic acid anhydrides, i.e., phthalic acid anhydride. Preferred are aliphatic dicarboxylic acids where n is from 2 to 4, i.e., succinic acid, glutaric acid, and adipic acid; the aromatic dicarboxylic acid phthalic acid; and the anhydrides thereof, e.g., succinic acid anhydride and phthalic acid anhydride. Especially preferred are succinic acid anhydride and phthalic acid anhydride.

The concentration of metal hexacarbonyl in the bis(allyl carbonate) polymerization is a permanently near infrared absorbing amount, i.e., from about 1.0 weight percent to the solubility limit thereof, and preferably from about 1.5 to about 4.0 weight percent, basis weight of the diol bis(allyl carbonate).

The concentration of saturated dicarboxylic acid in the bis(allyl carbonate) is an amount sufficient to allow the solubilization of a permanently near infrared absorbing amount of metal hexacarbonyl, i.e., from about 1.0 to 10 weight percent saturated dicarboxylic acid, and preferably from about 1.5 to about 4.0 weight percent saturated dicarboxylic acid.

Diol bis(allyl carbonate) monomers which may be utilized in this invention are normally linear, liquid allyl carbonates, i.e., glycol bis(allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether or alkylene carbonate group having from 2 to 10 carbon atoms. These diol bis(allyl carbonate) monomers are represented by the formula:

$$R_1-O-\overset{O}{\underset{\|}{C}}-O-R_2-O-\overset{O}{\underset{\|}{C}}-O-R_3$$

where $R_1$ and $R_3$ are allyl or substituted allyl groups, and $R_2$ is as defined below. $R_1$ and $R_3$ are independently represented by the formula:

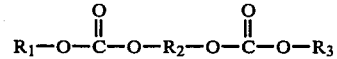

where $R_4$ may be hydrogen, halogen, or a 1 to 4 carbon alkyl group. Specific examples of $R_1$ to $R_3$ include allyl, 2-chloroallyl, 2-bromoallyl, 2-iodoallyl, 2-fluorallyl, 2-methallyl, 2-ethylallyl, 2-isopropylallyl, 2-n-propylallyl, and 2-n-butylallyl groups. Most commonly, $R_1$ and $R_3$ are allyl groups, 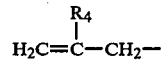. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene, alkylene ether groups such as $-CH_2-O-CH_2-$, $-CH_2CH_2-O-CH_2-CH_2-$, $-CH_2O-CH_2-CH_2-$, and $-CH_2CH_2-O-CH_2CH_2CH_2-$, alkylene polyether groups such as $-CH_2-CH_2-O-CH_2CH_2-O-CH_2CH_2-O-CH_2C_2-$ and $-CH_2CH_2-O-CH_2CH_2-$, and alkylene carbonate groups such as $CH_2CH_2-O-CO-O-CH_2CH_2$ and $-CH_2CH_2-O-CH_2CH_2-O-CO-O-CH_2CH_2-OCH_2CH_2-$. Most commonly, $R_2$ is $-CH_2CH_2-$, $-CH_2CH_2-O-CH_2CH_2-$, or $-CH_2CH_2-O-CH_2CH_2-O-CH_2CH_2-$.

Specific examples of diol bis(allyl carbonate) monomers useful in the invention herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Commercially important diol bis(allyl carbonate) monomers which are useful in the invention herein contemplated are triethylene glycol bis(allyl carbonate), diethylene glycol bis(allyl carbonate) and ethylene glycol bis(allyl carbonate), which can be represented respectively by the graphic formulae:

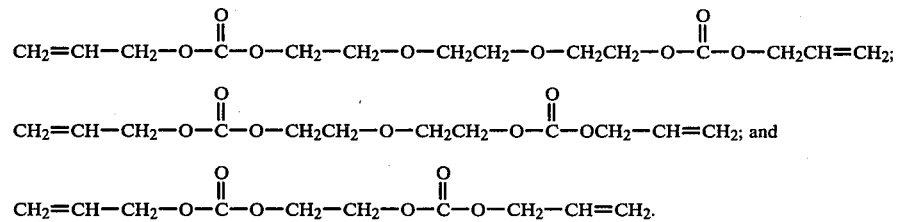

Especially preferred is diethylene glycol bis(allyl carbonate).

According to one exemplification of the invention herein contemplated, approximately 2 weight percent phthalic acid anhydride is added to diethylene glycol bis(allyl carbonate), and the composition heated to form a solution or substantially uniform dispersion of the acid in the diol bis(allyl carbonate). Thereafter, approximately 2 weight percent tungsten hexacarbonyl is added to the composition, and the composition heated to form a blue liquid. The blue liquid may be polymerized directly, or diluted with diol bis(allyl carbonate), e.g., diethylene glycol bis(allyl carbonate), and polymerized. In this way there is provided a near infrared absorbing polymerizate.

The following Examples are illustrative of the compositions and methods of the invention.

EXAMPLE I

A series of near infrared absorbing polymerizates of a phthalic acid anhydride and tungsten hexacarbonyl in diethylene glycol bis(allyl carbonate) were prepared.

Three hundred fifty grams of PPG Industries, Inc. CR-39 ® diethylene glycol bis(allyl carbonate) containing 5 parts per million hydroquinone monomethyl ether were placed in a 500 cubic centimeter round bottom flask, purged with nitrogen, and heated to 140° C. To this was added 10.5 grams phthalic acid anhydride and 10.5 grams of tungsten hexacarbonyl. The solution was then heated to 153° C. over a period of two hours. During the course of heating the solution changed from clear to yellow to dark green and finally to dark blue.

The solution remained dark blue. The solution was then filtered.

The resulting blue concentrated solution of tungsten hexacarbonyl and phthalic acid anhydride product in diethylene glycol bis(allyl carbonate) was then diluted with neat diethylene glycol bis(allyl carbonate) to form the samples shown in Table I. Each sample was polymerized, physically tested, and exposed to ultraviolet light.

Eighty grams of each of the samples shown in Table I was placed between two sheets of glass separated by a ⅛ inch (3.1 mm) thick gasket after adding 3.6 grams of diisopropyl peroxydicarbonate thereto. Each sample was cured according to the following cure cycle:

| Time Temperature Sequence For Diisopropyl Peroxydicarbonate Cure | |
|---|---|
| Cumulative Time (hours) | Temperature, °C. |
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

The resulting solid sheets were light tested in a weatherometer. The unexposed and exposed transmission and haze results shown in Table I, below, were obtained.

The sheets were then subjected to x-ray analysis, and the weight percent tungsten is shown in Table I, below.

TABLE I

| Run | Phthalic Anhydride W(CO)$_6$ Concentrate Parts | Neat Diethylene Glycol Bis (Allyl Carbonate) Parts | Tungsten (Calculated) (Percent) | Tungsten (X-Ray) (Percent) | Unexposed Transmission | Haze | Exposed Transmission | Haze |
|---|---|---|---|---|---|---|---|---|
| A | 1 | 0 | 1.47 | 0.68 | 75.9 | 2.1 | 1.3 | 4.7 |
| B | 9 | 1 | 1.32 | 0.62 | 78.1 | 1.6 | 1.9 | 4.1 |
| C | 3 | 1 | 1.10 | 0.52 | 80.9 | 1.9 | 3.7 | 2.3 |
| D | 3 | 2 | 0.88 | 0.42 | 83.3 | 1.8 | 6.6 | 0.8 |
| E | 1 | 1 | 0.74 | 0.35 | 85.1 | 1.4 | 8.6 | 0.5 |
| F | 1 | 3 | 0.37 | 0.18 | 89.0 | 1.2 | 28.9 | 0.7 |

EXAMPLE II

A series of tests were conducted to determine the effects of replacing maleic acid anhydride with phthalic acid anhydride in the diethylene glycol bis(allyl carbonate)-tungsten hexacarbonyl system.

Five liquid compositions were prepared by heating PPG Industries, Inc. CR-39 ® diethylene glycol bis(allyl carbonate) to about 140° C., adding the amount of the acid anhydride shown in Table II, below, to the heated diethylene glycol bis(allyl carbonate), and thereafter adding the amount of tungsten hexacarbonyl shown in Table II, below, to the composition of diethylene glycol bis(allyl carbonate) and acid anhydride. The solutions were then heated to 153° C. over a period of 2 hours. The solutions were cooled, and then filtered.

Samples of each solution were placed between two sheets of glass separated by a ⅛ inch (3.1 millimeter) thick gasket after adding 4.5 weight percent of diisopropyl peroxydicarbonate to the composition. The samples were cured according to the cure cycle used in Example I. The resulting sheets were light tested by exposure to a weatherometer. The transmission and haze results shown in Table II, below, were obtained.

TABLE II

| Run | Tungsten Hexacarbonyl (Weight Percent)* | Maleic Acid Anhydride (Weight Percent)* | Phthalic Acid Anhydride (Weight Percent)* | Haze | Initial Transmission | After 3 Hrs, 15 Min. Exposure Haze | Transmission | After 3 Hrs, 15 Min. Darkness Haze | Transmission |
|---|---|---|---|---|---|---|---|---|---|
| 1 | 1.5 | — | 2.00 | 4.0 | 67.0 | 3.0 | 14.0 | 3.0 | 13.0 |
| 2 | 1.0 | — | 1.33 | 4.4 | 74.0 | 2.0 | 19.0 | 3.0 | 19.0 |
| 3 | 0.5 | — | 0.67 | 2.4 | 83.0 | 1.0 | 44.0 | 1.5 | 19.0 |
| 4 | 0.5 | — | 2.0 | 0.4 | 88.0 | 0.6 | 54.0 | 0.7 | 53.0 |
| 5 | 0.5 | 2.0 | — | 1.5 | 74.0 | 1.0 | 44.0 | 1.5 | 19.0 |

*Basis: Weight of diethylene glycol bis(allyl carbonate)

EXAMPLE III

A near infrared absorbing polymerizate of succinic acid anhydride and tungsten hexacarbonyl in diethylene glycol bis(allyl carbonate) was prepared.

One hundred grams of PPG Industries, Inc. CR-39 ® diethylene glycol bis(allyl carbonate) was placed in a round bottom flask. Five grams of Eastman succinic acid anhydride was added to the diethylene glycol bis(allyl carbonate), and the composition slowly heated to 118° C., at which temperature the succinic acid anhydride was observed to be completely dissolved.

At about 120° C. approximately 0.5 gram of tungsten hexacarbonyl was added to the composition of succinic acid anhydride in diethylene glycol bis(allyl carbonate). Heating and mixing continued. At 160° C. effervescing and a slight yellow coloration occurred. At about 180° C. the liquid composition turned dark blue. The solution was thereafter cooled to room temperature and filtered.

The sample was then placed between two sheets of glass, separated by a ⅛ inch (3.1 millimeter) gasket, initiated with 4.5 weight percent diisopropyl peroxydicarbonate, and cured as described in Example I, above.

I claim:

1. A solid near infrared absorbing polymerizate of (1) a member selected from the group consisting of (a) saturated aliphatic dicarboxylic acid having the formula, $HOOC-(CH_2)_n-COOH$, wherein n is an integer from 1 to 8, (b) aromatic dicarboxylic acid selected from the group consisting of phthalic acid, isophthalic acid and terephthalic acid, and (c) acid anhydrides selected from the group consisting of phthalic acid anhydride and acid anhydrides having the formula,

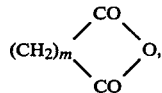

wherein m is 2 or 3, (2) diol bis(allyl carbonate), and (3) a near infrared absorbing amount of a metal hexacarbonyl selected from the group consisting of tungsten hexacarbonyl, molybdenum hexacarbonyl and vanadium hexacarbonyl, the acid or anhydride of (1) being present in amounts sufficient to solubilize the metal hexacarbonyl.

2. The infrared absorbing polymerizate of claim 1 wherein the acid anhydride is chosen from the group consisting of succinic acid anhydride and phthalic acid anhydride.

3. The infrared absorbing polymerizate of claim 1 wherein the concentration of dicarboxlic acid or acid anydride is from about 1.0 to 10 weight percent, basis diol bis(allyl carbonate).

4. The infrared absorbing polymerizate of claim 2 wherein the concentration of acid anhydride is from about 1.0 to about 10.0 weight percent, basis diol bis(allyl carbonate).

5. The infrared absorbing polymerizate of claim 1 wherein the diol bis(allyl carbonate) is represented by the formula:

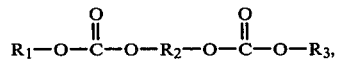

where $R_1$ and $R_3$ are allyl groups independently represented by the formula:

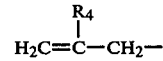

where $R_4$ is chosen from the group consisting of hydrogen, halogen, and $C_1$ to $C_4$ alkyl groups, and $R_2$ is chosen from the group consisting of alkylene groups, alkylene ether groups, alkylene polyether groups, alkylene carbonate groups, and alkylene polycarbonate groups.

6. The infrared absorbing polymerizate of claim 5 wherein the diol bis(allyl carbonate) is diethylene glycol bis(allyl carbonate).

7. The infrared absorbing polymerizate of claim 6 wherein the acid anhydride is succinic acid anhydride or phthalic anhydride and the metal carbonyl is tungsten hexacarbonyl.

8. The infrared absorbing polymerizate of claim 7 wherein the concentration of acid anhydride is from about 1.0 to about 10.0 weight percent, basis the diol bis(allyl carbonate), and the tungsten hexacarbonyl is present in amounts of from 1.5 to about 4.0 weight percent, basis the diol bis(allyl carbonate).

* * * * *